US011861724B2

(12) United States Patent
Carbery et al.

(10) Patent No.: US 11,861,724 B2
(45) Date of Patent: *Jan. 2, 2024

(54) VIRTUAL SIMULATION FOR INSURANCE

(71) Applicant: Allstate Insurance Company, Northbrook, IL (US)

(72) Inventors: Andrew L. Carbery, Bartlett, IL (US); Daniel Koza, Hinsdale, IL (US); Christopher G. Plachta, Glenview, IL (US); Philip Peter Ramirez, Arlington Heights, IL (US)

(73) Assignee: Allstate Insurance Company, Northbrook, IL (US)

( * ) Notice: Subject to any disclaimer, the term of this patent is extended or adjusted under 35 U.S.C. 154(b) by 37 days.

This patent is subject to a terminal disclaimer.

(21) Appl. No.: 17/534,722

(22) Filed: Nov. 24, 2021

(65) Prior Publication Data

US 2022/0164894 A1 May 26, 2022

Related U.S. Application Data

(63) Continuation of application No. 14/303,058, filed on Jun. 12, 2014, now Pat. No. 11,216,887.

(51) Int. Cl.
*G06Q 40/00* (2023.01)
*G06Q 40/06* (2012.01)
*G06Q 10/10* (2023.01)
*G06Q 40/08* (2012.01)

(52) U.S. Cl.
CPC .................. *G06Q 40/08* (2013.01)

(58) Field of Classification Search
CPC ........................................................ G06Q 40/08
USPC ............................................................ 705/4
See application file for complete search history.

(56) References Cited

U.S. PATENT DOCUMENTS

| 1,386,251 | A | * | 8/1921 | Garza | ............. E04B 2/56 52/274 |
|---|---|---|---|---|---|
| 2,118,338 | A | | 5/1938 | Bolhuis | |
| 4,896,373 | A | | 1/1990 | Blake | |
| 5,086,385 | A | | 2/1992 | Launey | |
| 5,275,565 | A | | 1/1994 | Moncrief | |
| 5,680,590 | A | | 10/1997 | Parti | |
| 5,944,784 | A | | 8/1999 | Simonoff | |

(Continued)

OTHER PUBLICATIONS

'Essential Techniques for Military Modeling and Simulation', Roger D. Smith, Proceedings of the 1998 Winter Simulation Conference.

(Continued)

*Primary Examiner* — Hai Tran
(74) *Attorney, Agent, or Firm* — Dinsmore & Shohl LLP (57) ABSTRACT

A driving accident simulation, having a virtual- or augmented-reality user interface, may be used to inform a driver of the driver's potential liability under different insurance options. The simulation may determine damages caused by the simulated accident, and identify multiple insurance options and the resulting user liability under each option. The simulation may also be used to assess an insurance adjuster's ability to estimate damages from an accident, by receiving the adjuster's estimate and comparing it to the simulation's own estimate of damages. In some embodiments, the simulation may present a driver with a simulated view from a point of view of another party to the simulated accident.

20 Claims, 9 Drawing Sheets

(56) References Cited

U.S. PATENT DOCUMENTS

| | | | |
|---|---|---|---|
| 5,982,352 | A | 11/1999 | Pryor |
| 6,868,386 | B1 | 3/2005 | Henderson et al. |
| 7,774,217 | B1 | 8/2010 | Yager |
| 7,809,586 | B2 | 10/2010 | Wahlbin et al. |
| 8,046,244 | B1 | 10/2011 | Yager |
| 8,452,621 | B1 | 5/2013 | Leong et al. |
| 11,216,887 | B1 | 1/2022 | Carbery et al. |
| 2001/0027389 | A1 | 10/2001 | Beverina |
| 2002/0036617 | A1 | 3/2002 | Pryor |
| 2002/0071038 | A1 | 6/2002 | Mihelcic |
| 2004/0002843 | A1 | 1/2004 | Robarts |
| 2005/0091018 | A1 | 4/2005 | Craft |
| 2005/0128068 | A1 | 6/2005 | Winick |
| 2006/0040239 | A1 | 2/2006 | Cummins et al. |
| 2006/0202953 | A1 | 9/2006 | Pryor et al. |
| 2007/0136109 | A1 | 6/2007 | Yager |
| 2007/0265089 | A1 | 11/2007 | Robarts |
| 2008/0046353 | A1 | 2/2008 | Poltorak et al. |
| 2008/0082372 | A1 | 4/2008 | Burch |
| 2010/0149093 | A1 | 6/2010 | Edwards |
| 2010/0174566 | A1* | 7/2010 | Helitzer ............... G16Z 99/00 705/4 |
| 2011/0161119 | A1 | 6/2011 | Collins |
| 2012/0022896 | A1 | 1/2012 | Jayaram |
| 2012/0135382 | A1 | 5/2012 | Winston et al. |
| 2012/0173290 | A1 | 7/2012 | Collins et al. |
| 2012/0295230 | A1 | 11/2012 | Esposito |
| 2013/0151012 | A1 | 6/2013 | Shetty |
| 2013/0191170 | A1 | 7/2013 | Jarrett |
| 2013/0204645 | A1 | 8/2013 | Ehman et al. |
| 2013/0238365 | A1 | 9/2013 | Nepomuceno |
| 2014/0114674 | A1 | 4/2014 | Krughoff et al. |
| 2015/0006023 | A1 | 1/2015 | Fuchs |
| 2015/0039397 | A1 | 2/2015 | Fuchs |
| 2015/0310758 | A1 | 10/2015 | Daddona et al. |

OTHER PUBLICATIONS

Insurance and the Natural Hazards, D.G. Friedman, Journal of ASTIN and AFIR Section of the International Actuarial Association, Dec. 1972.
Dialog NPL Search Report, dated Aug. 24, 2021 (Year: 2021).
Jan. 22, 2016—(US) Non-Final Office Action—U.S. Appl. No. 14/302,994.
"Farmers Insurance, Training Based Learning Simulator" webpage, http://www.forgfx.com/casestudies/farmers/training-simulation.htm, ForgeFX Simulations, date captured Jun. 11, 2014.
"Innovation and Tradition in the 21st Century" webpage, http.//www.3diltd.co.uk/; 3 Dimensional Insurance Limited, date captured Jun. 11, 2014.
"Games and Fun" webpage, http://www.nrma.com.au/help-information/games-fun, NRMA Insurance, date captured Jun. 11, 2014.
"Improving Seismic Risk Assessment for the Insurance industry by using 3-D Finite Element Modelling", Axel Muhlhausen et al., Publication date unknown but believed to be before Jun. 11, 2014.
"Simulation for a Large Insurance Brand and a Related Partner" webpage, http://www.visualpurple.com/about/case-studies/, Visual Purple, LLC, date captured Jun. 11, 2014.
"State Farm Road Aware" webpage, http://teendriving.statefarm.com/road-aware, State Farm, date captured Jun. 11, 2014.
"Lattice Technology Solutions Deliver 3D to Motor Insurance Repair Research Center" webpage, http://www.lattice3d.com/lattice-technology-solutions-deliver-3d-to-motor--insurance-repair-research-center/, Lattice Technology, 2010 Press realease,exact date unknown.
"Wolters Kluwer—JobJungle" webpage, http://www.daily-interactive.com/en/pages/jobjungle, date captured Jun. 11, 2014.
"HIMEX Launches UBI 3D.TM. for Personal and Commercial Lines Insurance: a Single Platform for Usage Based Insurance in a Game-based Virtual World" webpage,http://www.prnewswire.com/news-releases/himex-launches-ubi-3d-for-personal-and-commercial-lines-insurance-a-single-platform-for-usage-based--insurance-in-a-game-based-virtual world-206432721.html, PR Newswire A UBM plc company, dated May 7, 2013.
"Driver Seat Game" webpage, http://www.libertymutual.com/auto-insurance/senior-driving/driveseat, Liberty Mutual Insurance, date captured Jun. 11, 2014.
Aug. 9, 2016—(US) Final Office Action—U.S. Appl. No. 14/302,994.
A. Muuhlhausen et al., Seismic Risk Assessment for Masonry Buildings based on Discriminant Analysis of a Virtual Database, 15 WCEE, Lisboa 2012.
Jan. 13, 2017—(US) Non-Final Office Action—U.S. Appl. No. 14/302,994.
File: "Fonz 1976 sega arcade flyer.jpg," from Wikimedia Commons, the free media repository, accessed Jan. 9, 2017, from www.https://commons,wikimedia.org/wiki/File:Fonz_1076_sega_arcade_flyer.JPG, 3 pages.
Zaniolo, Carlo, "Event-Oriented Data Models and Temporal Queries in Transaction-Time Databases," 2009, 16th International Symposium on Termporal Representation and Reasoning, TIME 2009, pp. 47-53, 2009.
Dec. 8, 2017—(US) Non-Final Office Action—U.S. Appl. No. 14/604,033.
Jul. 27, 2018—(US) Final Office Action—U.S. Appl. No. 14/604,033.
Oct. 11, 2018—(US) Non-Final Office Action—U.S. Appl. No. 14/302,994.
Jun. 26, 2019—(US) Final Office Action—U.S. Appl. No. 14/302,994.
Jun. 11, 2021—(US) Non-Final Office Action—U.S. Appl. No. 14/302,994.
Slob, J.J., "State-of-the-Art Driving Simulators, a Literature Survey", DCT Report, Aug. 2008 (Year: 2008).
Diete, Frank, "Evaluation of a Simulator Based, Novice Driver Risk Awareness Training Program", University of Massachusetts Amherst, Feb. 2014 (Year: 2014).
Jun. 27, 2019—(US) Non-Final Office Action—U.S. Appl. No. 14/604,033.
Apr. 7, 2020—(US) Final Office Action—U.S. Appl. No. 14/604,033.
Sep. 25, 2020—(US) Non-Final Office Action—U.S. Appl. No. 14/302,994.

* cited by examiner

Auto 1 Damages

| | |
|---|---|
| Body Hood | $409 |
| Body Fender | $330 |
| Left Head Lamp Assy | $110 |
| Radiator | $279 |
| Water Pump | $79 |
| Labor 30 x $60/hr | $1,800 |
| Total Auto: | $3,007 |

Personal Damages

| | |
|---|---|
| Driver 1 | $22,409 |
| Passenger 1 | $18,000 |
| Driver 2 | $7,222 |
| Total Personal: | $47,631 |

Auto 2 Damages

| | |
|---|---|
| Body Hood | $740 |
| Body Fender | $225 |
| Radiator | $200 |
| Total Auto 2: | $1165 |

Based on Your Driving Simulation, Here are Your Liability Options

| | | Plan A | Plan B | Plan C |
|---|---|---|---|---|
| Total Auto: | $4,172 | $4,172 | $2,000 | -0- |
| Total Personal: | $47,631 | $47,631 | $25,000 | -0- |
| Monthly Premium: | | $100 | $250 | $400 |
| Select Desired Plan | | Select | Select | Select |

You have earned a 2% discount just for doing this simulation!

More   Exit

Your Driving Performance:

| | |
|---|---|
| Average Speed – Under Limit | +10 |
| Sudden Braking – 3/hr | -10 |
| Rolling Stop – 90% | -10 |
| Squeezing Yellow – 75% | -10 |
| Running Red – 0% | 0 |
| Lane Wanderer – 2/hr | -10 |
| Unsignaled Lane Change – 2/hr | -10 |
| Fast Lane Change – 4/hr | -20 |
| <u>Tailgater – 5/hr</u> | <u>-30</u> |
| Total: | -90 |

Premium Grade – C+
Press Any Key to See Premium Options

| | | Your Estimated Liability | |
|---|---|---|---|
| Your Home Risks (per annum.) | Est. Damage | Plan A | Plan B |
| Kitchen Fire while Cooking (0.2%) | $20k | $10k | $20k |
| House Fire (0.18%) | $100k | $50k | $75k |
| Burglary (2%) | $2k | $0 | $1k |
| Tornado (0.05%) | $177k | $50k | $100k |
| | | Select | Select |

More  Exit

Given your Home Parameters, Your Risk of the Following in a time period of _1_ year appears to be:

| | |
|---|---|
| Fire (minor damage under $10k) | 1% |
| Fire (moderate damage under $50k) | .5% |
| Fire (catastrophic damage over $50k) | .2 |
| Flood | .05% |
| Theft | 2% |

Your estimated Total Losses appears to be:

| | |
|---|---|
| A) Chance of loss under $500 | 40% |
| B) Chance of loss between $500 and $1k | 30% |
| C) Chance of loss between $1k and $5k | 5% |
| D) Chance of loss between $5k and $25k | 1% |
| E) Chance of loss between $25k and $100k | .07% |
| F) Chance of loss over $100k | .01% |

Based on Your Home Simulation, Here are Your Total Liability Estimates and Options

| | Plan A | Plan B | Plan C |
|---|---|---|---|
| Loss A | Full Amt | Full Amt | -0- |
| Loss B | Full Amt | Full Amt | -0- |
| Loss C | Full Amt | $500 | -0- |
| Loss D | $5k | $5k | $1k |
| Loss E | $20k | $15k | $10k |
| Loss F | $50k cap | $100k cap | $500k cap |
| Monthly Premium: | $100 | $250 | $400 |
| Select Desired Plan | Select | Select | Select |

You have earned a 2% discount just for doing this simulation!

More    Exit

VIRTUAL SIMULATION FOR INSURANCE

CROSS-REFERENCE TO RELATED APPLICATIONS

This application is a continuation of U.S. patent application Ser. No. 14/303,058 filed Jun. 12, 2014, entitled "VIRTUAL SIMULATION FOR INSURANCE", which is hereby incorporated by reference herein in its entirety.

BACKGROUND

Selecting an appropriate level of insurance is a challenge for most insurance customers. It can be difficult to gauge what kinds of liability coverage, deductible levels, and other options a particular user may wish to have, and many users end up selecting coverage that is either too much coverage or not enough coverage. There remains an ever-present need to help insurance customers make better-informed decisions when selecting their insurance.

BRIEF SUMMARY

In light of the foregoing background, the following presents a simplified summary of the present disclosure in order to provide a basic understanding of some aspects of the features described herein. This summary is not an extensive overview of all of the features described herein. The following summary merely presents some concepts in a simplified form as a prelude to the more detailed description provided below.

In some embodiments, a user may undertake a driving simulator on a computing device, and when a simulated accident occurs, the computing device may evaluate the estimated damages from the simulated accident. The computing device may then calculate a plurality of liability estimates for the user corresponding to different insurance coverage options, indicating how much the user would have paid for the simulated accident had the user purchased the different insurance coverage options, and present these liability estimates to the user. The user may then use these liability estimates to determine a level of coverage to select, and the computing device may initiate the establishment of insurance coverage for the user under the selected insurance options.

In some embodiments, the driving simulator need not result in a simulated accident. The computing device may simply observe the user's driving habits, and use those habits to determine an insurance premium rate, or level of risk and driving skill, for the user. The computing device may then offer the user a plurality of insurance coverage options with corresponding premium rates based on the user's evaluated level of risk and driving skill. In some embodiments, the mere fact that the user subjected himself/herself to the driving simulator may earn the user a premium discount on insurance coverage.

In some embodiments, the driving simulator may present the user with a variety of driving impairments to test the user's ability to handle driving under adverse conditions.

In some alternative embodiments, the computing device may offer simulations for activities other than driving. For example, a home simulation may be performed to observe and/or simulate a user's home living conditions, and to assess the user's risk for home accidents or crimes that would be covered by a homeowner's insurance policy. The computing device may then offer the user a plurality of homeowner's insurance coverage options, with information identifying different liability estimates under the different options.

In some embodiments, the simulations described herein may be used to train insurance adjusters in estimating costs of repair. The computing device may determine an actual cost estimate for damages incurred in an accident, and may then allow the adjuster to provide his/her own estimate of the damages. The adjuster's performance may then be evaluated by comparing the adjuster's estimate with the estimate generated by the computing device.

In some instances, the simulated accident may use data from actual accidents (e.g., providing photographs from an actual accident, and using the actual cost of repair).

The methods and systems of the above-referenced embodiments may also include other additional elements, steps, computer-executable instructions, or computer-readable data structures. In this regard, other embodiments are disclosed and claimed herein as well. The details of these and other embodiments are set forth in the accompanying drawings and the description below. Other features and advantages will be apparent from the description, drawings, and claims.

BRIEF DESCRIPTION OF THE DRAWINGS

Features herein are illustrated by way of example and is not limited in the accompanying figures in which like reference numerals indicate similar elements and in which.

DETAILED DESCRIPTION

In accordance with various aspects of the disclosure, methods, computer-readable media, software, and apparatuses are disclosed that allow users to engage in a simulation, such as a driving simulation, resulting in an eventual simulated accident. The system may estimate the damages incurred in the simulated accident, and then may inform the user of the user's out-of-pocket liability under different insurance coverage scenarios. For example, different amounts of deductibles and coverage types may result in different liability amounts, and the user may be able to see what level of liability the user is most comfortable with. The user may then use the liability estimates to select one or more insurance options to purchase. The simulation may be a driving simulation, simulation of a home accident, or any other desired type of simulation. In addition to allowing the user to see the effect of different insurance coverage options, the simulation herein may also be used to assess the user's risk for establishing premium levels, to train the user in becoming a safer driver or having a safer home, and to also train insurance adjusters in estimating damages for an accident. These and other features will be described in further detail below.

Figure 1:
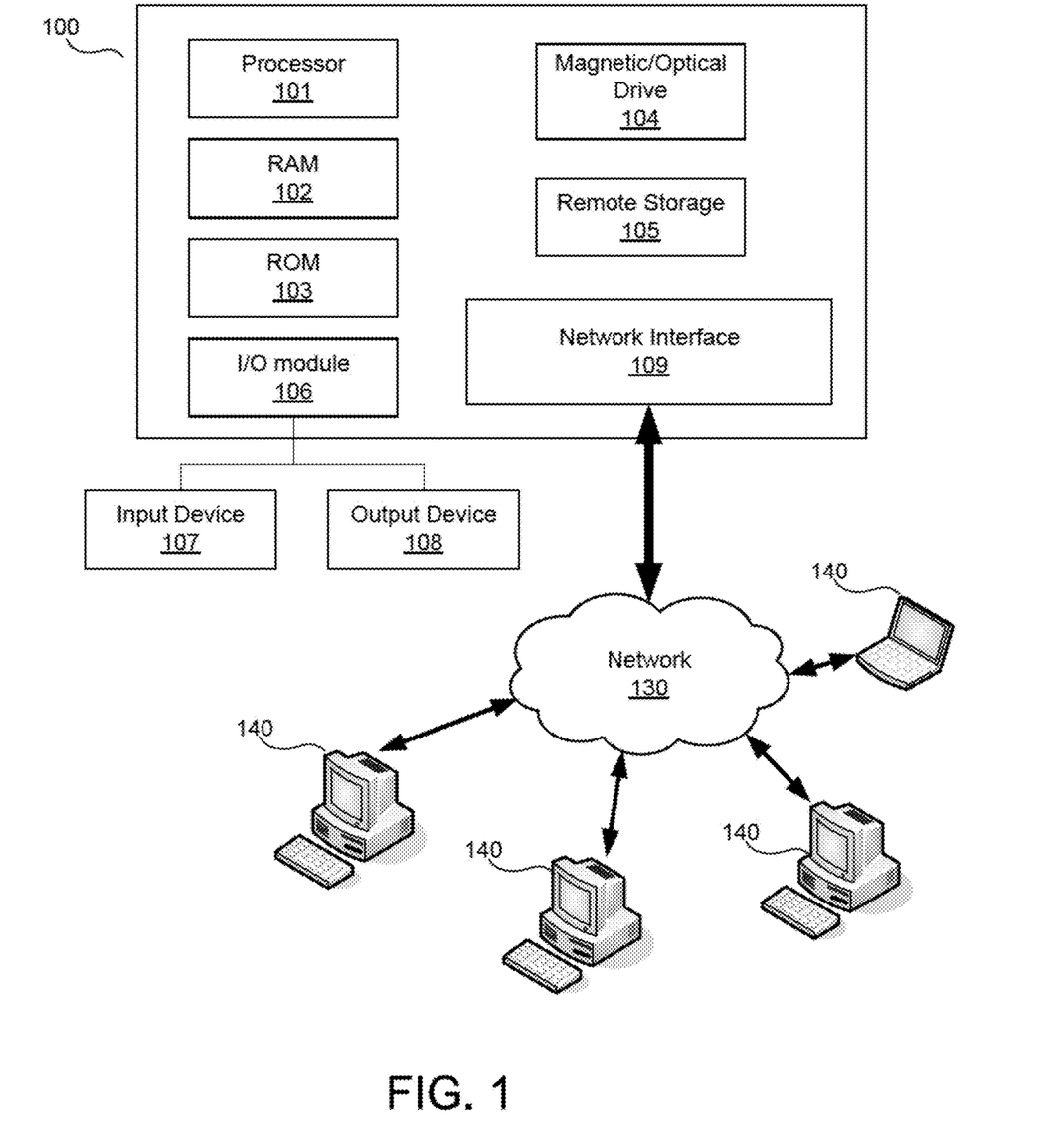
FIG. 1 is a block diagram of an example computing device that may be used according to an illustrative embodiment of the present disclosure.

In one or more arrangements, teachings of the present disclosure may be implemented with a computing device. FIG. 1 illustrates a block diagram of an example computing device 100 that may be used according to an illustrative embodiment of the present disclosure. The computing device 100 may be similar to any available computing device, such as a personal computer (e.g., a desktop computer), server, portable computing device, laptop computer, notebook, tablet, smartphone, gaming console, etc. The computing device 100 may have one or more processors 101, which may execute instructions stored in one or more computer-readable media, such as one or more random access memories (RAM) 102, read-only memories (ROM) 103, magnetic or optical disk drive 104, remote network storage 105, or any other desired storage medium.

An input/output (I/O) module 106 may include communication interfaces for receiving and producing user inputs and outputs. The interfaces may include interfaces for a variety of user input devices 107, such as keyboards, joysticks, touchpads, motion sensors, accelerometers, gyroscopes, microphones, cameras, infrared sensors, or any other desired type of user input device. The interfaces may also include interfaces for output devices 108, such as one or more video displays, audio speakers, and any other desired type of user output device. In some embodiments, the user input and/or output devices may be VR simulation devices. A VR output device 108 may be a head-wearable display device, such as eyeglass displays, VR helmet displays, goggle displays, and the like, which may present a user's eyes with separate images for left- and right-eye viewing. The VR output device 108 may present the user with a virtual environment that simulates the interior of an automobile, home, or other environment. The VR input devices 107 may detect the user's eye, hand, head and/or body positioning to adjust the display on the output device 108 accordingly, to provide the user with an immersive virtual world experience. The VR input devices 107 may also include one or more control devices, such as a simulated steering wheel, dashboard with touch interface, remote control with buttons, etc., to further simulate user input devices in the virtual world.

The network interface 109 allows the computing device 100 to connect to and communicate with a network 130. The network 130 may be any type of network, including a local area network (LAN), local wireless network (e.g., 802.11, BLUETOOTH, etc.) and/or a wide area network (WAN), such as the Internet. Through the network 130, the computing device 100 may communicate with one or more computing devices 140, such as laptops, notebooks, smartphones, personal computers, servers, etc. The computing devices 140 may also be configured in the same manner as computing device 100. In some embodiments the computing device 100 may be connected to the computing devices 140 to form a "cloud" computing environment.

The network interface 109 may connect to the network 130 via communication lines, such as coaxial cable, fiber optic cable, etc. or wirelessly using a cellular backhaul or a wireless standard, such as IEEE 802.11, IEEE 802.15, IEEE 802.16 etc. In some embodiments, the network interface may include a modem. Further, the network interface 111 may use various protocols, including TCP/IP, Ethernet, File Transfer Protocol (FTP), Hypertext Transfer Protocol (HTTP), etc., to communicate with other computing devices 140.

The computing device 100 may be a mobile device (e.g., a smartphone), and thus, may also include various other components, such as a battery, speaker, and antennas (not shown).

Figure 2A:
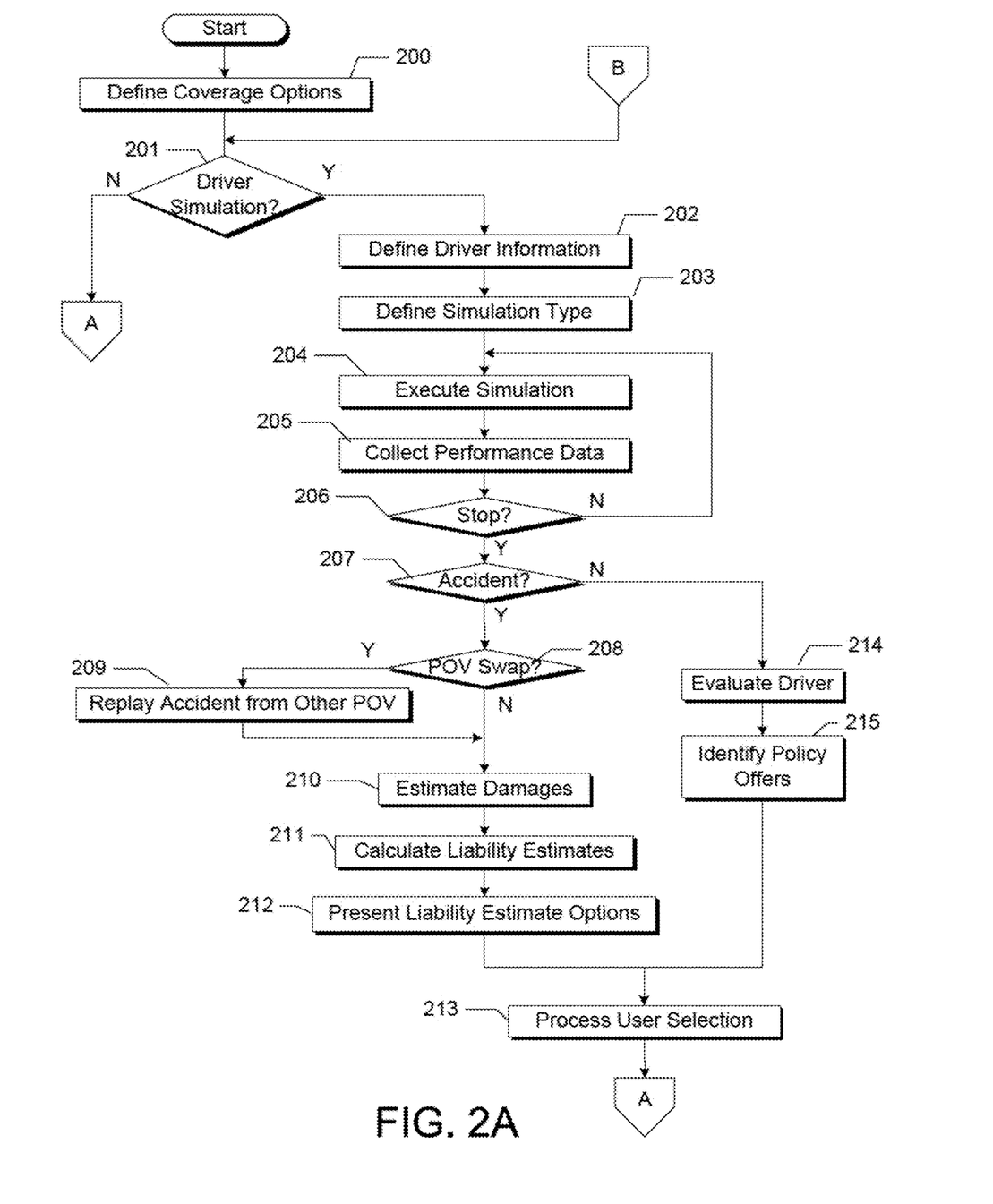
FIGS. 2A-B illustrate a flow diagram of an example method of providing various features described herein.
Figure 2B:
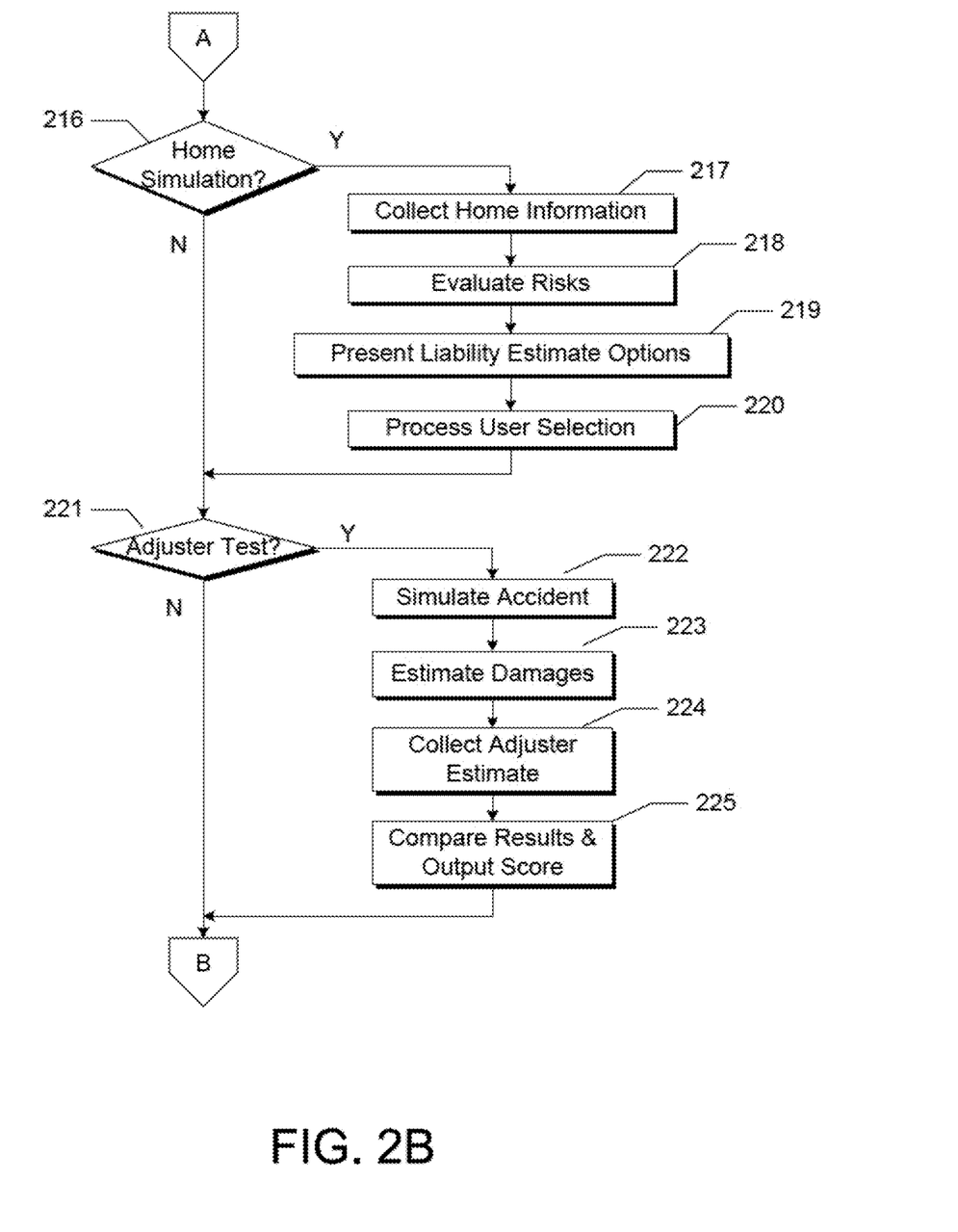

The computing device 100 may be programmed, by executing instructions stored on one or more of the computer-readable media discussed above (e.g., RAM 102, ROM 103, drives 104, storage 105, etc.), to perform the process shown in FIGS. 2A-B. In step 200, the computing device may begin by defining the various insurance coverage options that will be available. The options may be defined in any desired manner in the insurance field, and may be provided by one or more insurance administrators. Example coverage options may include dollar limits on coverage (e.g., $500,000 per accident), types of accident events covered (e.g., liability insurance, comprehensive coverage regardless of legal liability for accident, etc.), deductible amounts, etc. The coverage options may also include defining how driver skill will affect the premium charged. For example, various factors of driving performance (e.g., adherence to speed limits, maintaining assured clear distance, sudden lane changes or acceleration/deceleration, etc.) may indicate a driver's overall level of driving skill, and different levels of driving skill may warrant different levels of plan premiums for automobile insurance coverage.

In step 201, the computing device 100 may determine whether a user has requested to engage in a driving simulation. This may occur, for example, by the user executing a driving simulation program on the computing device 100. If the computing device 100 is offering its simulation over the Internet, then this may occur if the user accesses the Internet page that begins the driving simulation.

If the user has requested a driving simulation, then in step 202, the computing device 100 may begin by defining information for the driver. The information may include information identifying the user (e.g., a name, account number, etc.), demographic information of the user (e.g., age), driver license restrictions (e.g., motor vehicle class, vision requirements, etc.), and any other desired driver information. The information may be obtained by prompting the user, retrieving from a previously-stored database, or any combination of the two (e.g., the user may enter an account number, and the computing device may retrieve corresponding user identification information from a customer database).

In step 203, the computing device may define the type of driving simulation to be performed. For example, different driving simulations may test different types of driving. One simulation may focus on highway driving, while another may emphasize suburban or city driving, and different simulations may have different amounts of traffic volume (e.g., one simulation may simulate a busy, rush-hour level of traffic congestion, while another may simulate sparse traffic). Simulation types may also vary by vehicle type or condition—one simulation may use a 4-door sedan with rear-wheel drive, while another simulation may use an all-wheel drive wagon or sport utility vehicle. One simulation may use a high-powered engine, while another simulation may use a low-powered engine. Different safety features of the vehicles may be used as well—one simulation may use a vehicle having anti-lock brakes, seat belts and air bags, while another simulation may omit air bags. Vehicle conditions may also be varied. One simulated car may have poor quality tires with lower traction or increased likelihood of running flat, while another simulated car may have poor condition brakes. Tire condition, inflation pressure, and any other vehicle condition may be simulated.

Simulation types may also vary by weather or environmental conditions. For example, one simulation may simulate driving in snowy, icy conditions, in which case vehicle performance may be adversely affected (e.g., simulated tire traction may be reduced). Another simulation may simulate heavy rain conditions and fog, reducing visibility of the driver. Another simulation may involve night-time driving.

Other types of impairments to the driver may be simulated as well. For example, driver distraction impairments may be applied to the driving experience. The computing device may, for example, simulate an in-car conversation by providing spoken text to the user during the simulation, and may require a verbal response from the user to confirm participation in the conversation. A simulated phone call or text message may arrive during the driving simulation, requiring the user to respond by, for example, locating and pressing one or more buttons on a simulated cell phone. The user may be prompted to change a virtual radio station, requiring the user to manipulate buttons on a virtual car radio. If the computing device 100 is configured with a computer-controlled fan, then another driving impairment may be a blast of air on the user's face, simulating a sudden gust when a passenger opens a window. Another driving impairment may be motion or vibration. For example, the user may be sitting in a chair that contains a motor, allowing the computing device 100 to cause the chair to move or shake. Vibration may also be implemented in the user's steering wheel or other handheld control. Such motion and/or vibration may help further improve the simulation by simulating driving events such as the car running over rumble strips, striking an animal, etc.

Driver impairments may also include simulated drunken or drowsy driving. User inputs (e.g., the user turning a steering wheel to control the virtual automobile) may be delayed to simulate delayed reaction time of a drunk or drowsy driver. The visual display may be reduced to a tunnel vision or blank screen to simulate impaired vision.

All of the various simulation types discussed above may be selected in step 203 to define the type of driving simulation that is desired. The selection may be made, for example, by prompting the user to select available simulation options. Alternatively, the selection may be made automatically and without the user's selection (e.g., a random test may be administered to the user, to help fully assess the user's true driving skill in an unexpected situation).

Figure 3A:
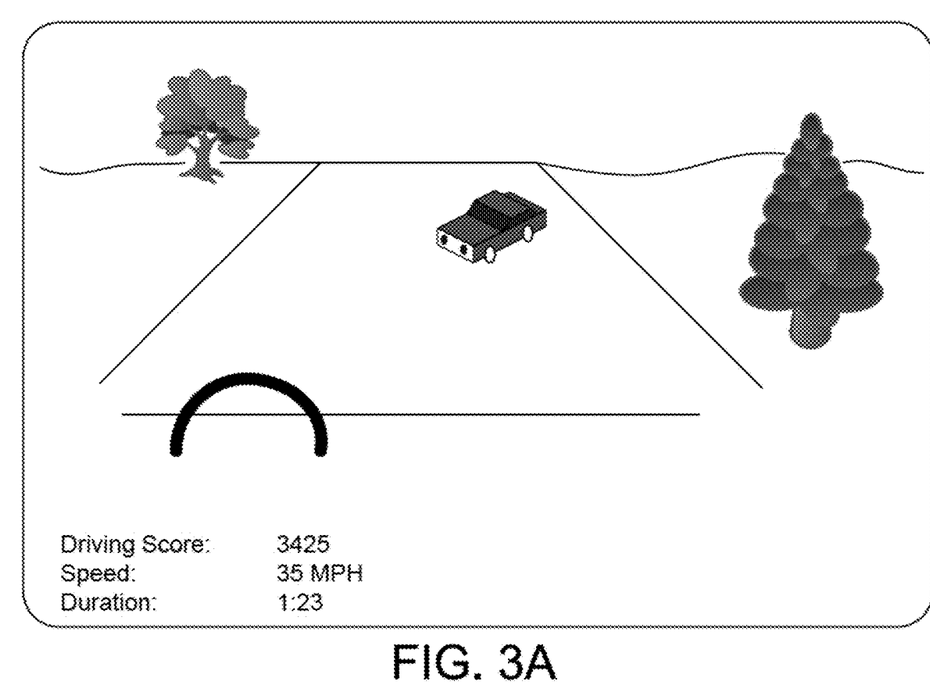
FIGS. 3A-B, 4A-B, 5 and 6 illustrate example screen displays that may be provided to a user during the example method of FIGS. 2A-B.

After the simulation type has been defined, the computing device 100 may proceed to step 204, and begin executing the simulation. Executing the simulation may include, for example, generating for display a three-dimensional simulated driving environment, such as that shown in FIG. 3A. The simulated driving environment may include a driver's view of a simulated car driving on a simulated road, with simulated obstacles such as trees and other traffic. If desired, the simulation may include other users. For example, multiple users, each using their own computing device 100 (or another device 140) and engaging in a driving simulation, may be placed in a shared simulation through networked communications between their respective computing devices 100. The shared simulation may provide a simulated environment in which both users operate their own simulated vehicles, and the users may suffer a virtual accident together. Including multiple real-world users in the simulation may help to enhance the simulation's behavior, by providing the unpredictable actions of another user. The user may control the driving experience using any desired input device 107, such as a steering wheel controller, gas and brake pedal controller, keyboard controller, touchscreen tablet, camera, infrared sensor, or any other desired type of user input device, and the computing device 100 may react accordingly in response to the user's inputs. The computing device 100 may provide the various types of simulation noted above (e.g., snowy, rainy, busy traffic, etc.), and in step 205, may collect the user's performance data. The collection of performance data may include collecting a variety of types of data. For example, the performance data may include information identifying how much assured clear distance the user maintains with the car in front, how well the user obeys speed limits and other traffic signs, how quickly the user accelerated or decelerated the car, how well the user stayed within a lane, how safe the user was in signaling and making a lane change, or any other desired driving skill parameter.

As part of the simulation, the computing device 100 may also provide training information to help improve the user's driving skills. For example, the computing device 100 may provide pop-up icons highlighting areas where a driver should be focusing attention (e.g., cross traffic at intersections, parked car doors, etc.). The computing device 100 may include a ghost car in the simulation, where the ghost car represents another virtual car that is practicing safe driving (e.g., driving at a safe speed, in a correct line through the traffic, etc.). The user can see how he/she differs from the ghost car's performance, and may adjust his/her own driving habits to more closely mimic the safe driving habits exhibited by the ghost car.

Figure 3B:
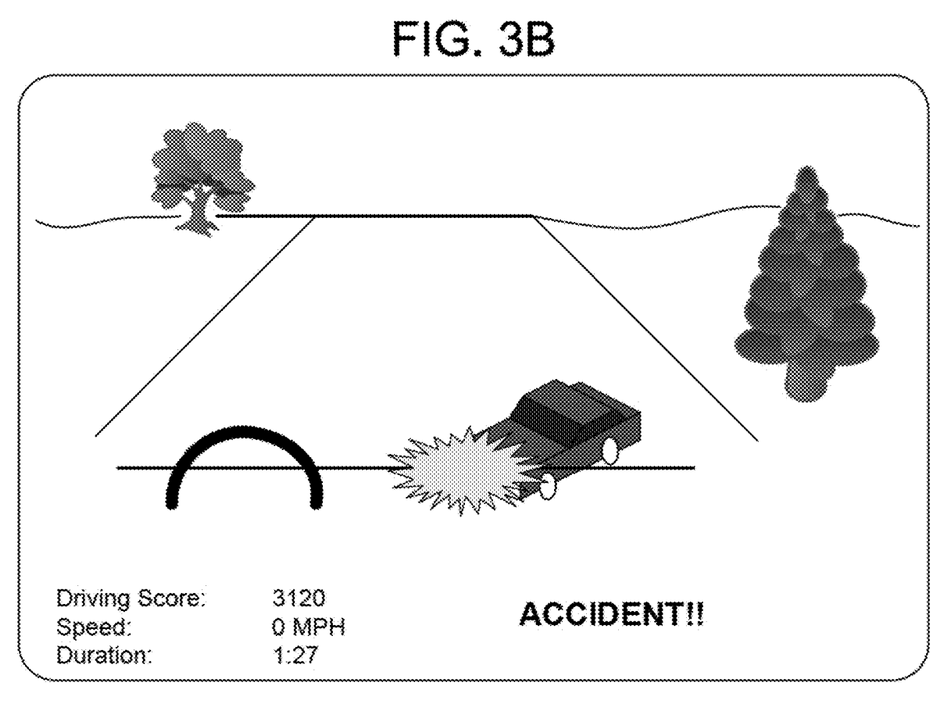

As seen in FIG. 3B, the driving simulation may eventually include the user getting into a virtual accident. When an accident occurs, the computing device 100 may simulate the collision and resulting damage to the user's car and any other property involved in the accident. The simulation may be a detailed crash simulation, taking into account the user's car characteristics (crumple zones, air bags, etc.), speed, direction and that of any other car or property involved in the accident.

In step 206, the computing device 100 may determine whether it is time to stop the simulation. The simulation may be stopped, for example, when the user decides to terminate the simulation, or when the simulation has reached a predetermined virtual location or time duration. The simulation may also stop when the user gets involved in a virtual car accident.

If the simulation is not ready to stop, then the process may return to step 204 to continue executing the simulation and collecting performance data. If the simulation is to stop, then in step 207, the computing device 100 may determine whether there was an accident, or collision between the user's virtual car and another object in the simulated environment.

Figure 10A:
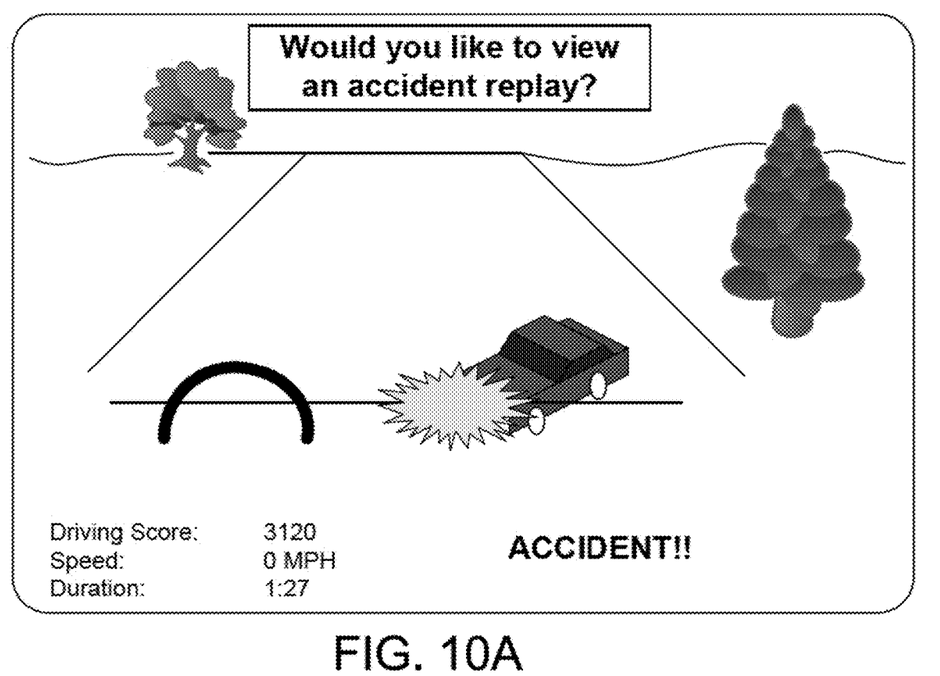
FIGS. 10A-B illustrate additional example screen displays.
Figure 10B:
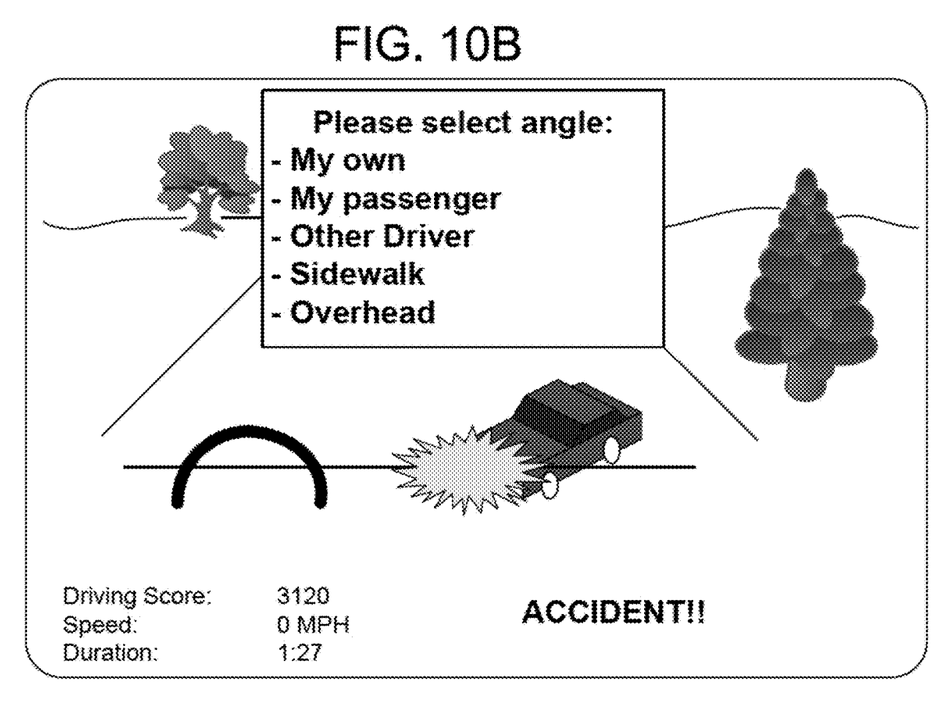

If there was an accident, then in step 208, the computing device 100 may determine whether the user should be presented with an alternative angle view of the accident. This determination may be made automatically, so that an accident replay is automatically provided after ever accident, or the determination may be at the user's request. For example, the user may be given a prompt 1001, shown in FIG. 10A, requesting whether the user wishes to view the accident from the alternative view. If the user responds in the affirmative, then in step 209, the computing device 100 may provide the requested accident replay to the user. As part of the presentation, the user may be given an option to choose a viewing angle from a variety of available viewing angles. As shown in FIG. 10B, the user may choose to view the accident from their own perspective, the perspective of a passenger in the user's car, the perspective of another driver involved in the simulated accident, or an external fixed view such as from a sidewalk or overhead.

In step 209, the user may then view the accident from the other point of view, and may learn how to improve their driving by seeing how their own actions affected, and were seen by, others.

If there was an accident, then in step 210, the computing device 100 may estimate the damages incurred in the accident. In some embodiments, the virtual accident may in fact be based on an actual accident. For example, the computing device 100 may store, or have access to, a database of historical accident information identifying car types, collision parameters (e.g., direction of impact, relative speeds of vehicles involved, etc.), and ensuing actual damages. When the user's virtual car collides with another virtual car, the computing device 100 may determine whether the car types, speed and direction of impact in the virtual collision match the car types, speed and direction of impact of a historical accident identified in the database. For example, if the user is driving a virtual 2010 Honda Civic and collides head-on with a virtual 2011 Toyota Camry at a combined speed of 50 MPH, the computing device may determine whether a similar accident may have occurred before. If such an accident is in the historical database, then the computing device may retrieve the actual damages that were incurred in that accident in the historical database.

The computing device 100 may use the database in determining what type of virtual car to use for the traffic in the driving simulation. For example, if the historical database indicates a relatively large number of collisions between the user's car and a particular type of other car, then the computing device 100 may select that other type of car for the virtual traffic. The computing device 100 may also take steps to simulate actual historical accidents by, for example, swerving a virtual opposing car into the user's lane at the speed of a prior collision.

Figure 4A:
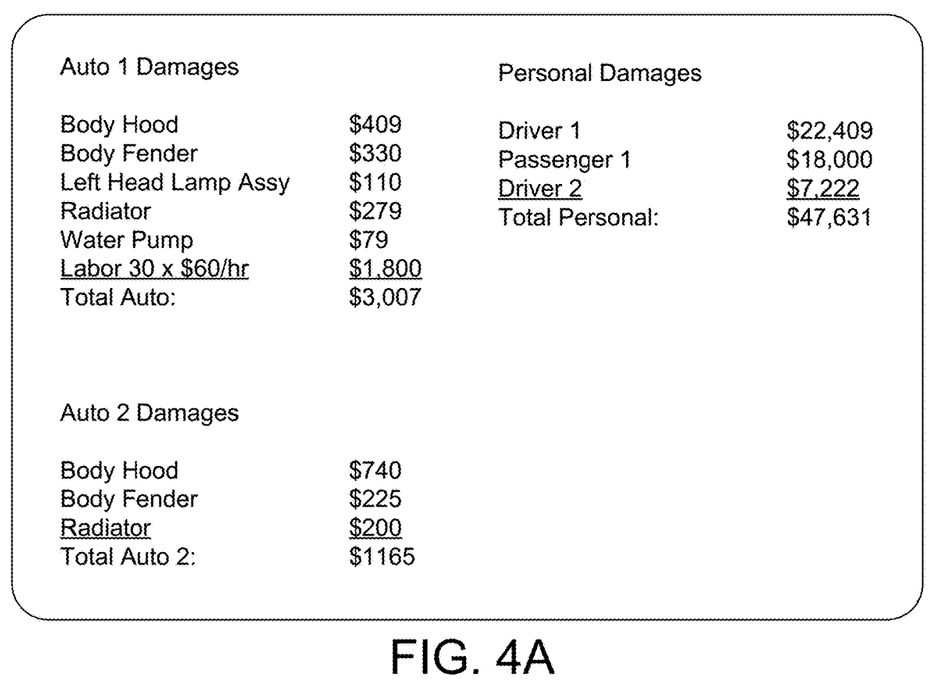

If there is no actual historical accident data corresponding to the user's simulated accident, then the computing device 100 may estimate the damages virtually. In some embodiments, the actual damages may be displayed to the user, as shown in FIG. 4A, to allow the user to appreciate how quickly damages can add up in an accident.

In step 211, the computing device 100 may then calculate the user's liability estimates under different insurance policy provisions. For example, if different insurance policies cover different types of damages, then the user's estimated liability under the different policies will be different. One example way in which policies may differ is in the determination of fault in determining liability. Some policies offer comprehensive coverage regardless of who is at fault in a particular accident, while other policies offer reduced (or no) coverage if the user is not at fault in the accident. The determination of fault in a virtual accident may be made by the computing device 100 (e.g., the computing device 100 may determine whether the user had obeyed relevant traffic laws at the time of the collision, or if the virtual opposing car broke traffic laws to cause the accident), and that determination may result in different amounts of user liability for the accident's damages.

Another way in which the user's liability may change comes from the coverage limit. Different policies may place different limits on the amount of damages that will be covered by the policy, and this difference may result in different amounts of user liability.

Another difference is in the user's deductible. Different deductible amounts in the policies will result in different amounts of user's liability for damages.

Another variation is in the uninsured motorist provision. Some policies offer different amounts of coverage if the opposing driver is an uninsured driver, so these different policies may result in different amounts of user liability in the event of an accident. When the computing device 100 generates the virtual opposing car in the driving simulation, the computing device 100 may determine whether that opposing car is driven by a virtual uninsured motorist, or if the other car is driven by another user, the device 100 may determine that the other user is uninsured for purposes of the simulation.

Other variations may apply as well, and in step 211, the computing device 100 may calculate a plurality of different user liability estimates for the various variations in possible coverage options.

Figure 4B:
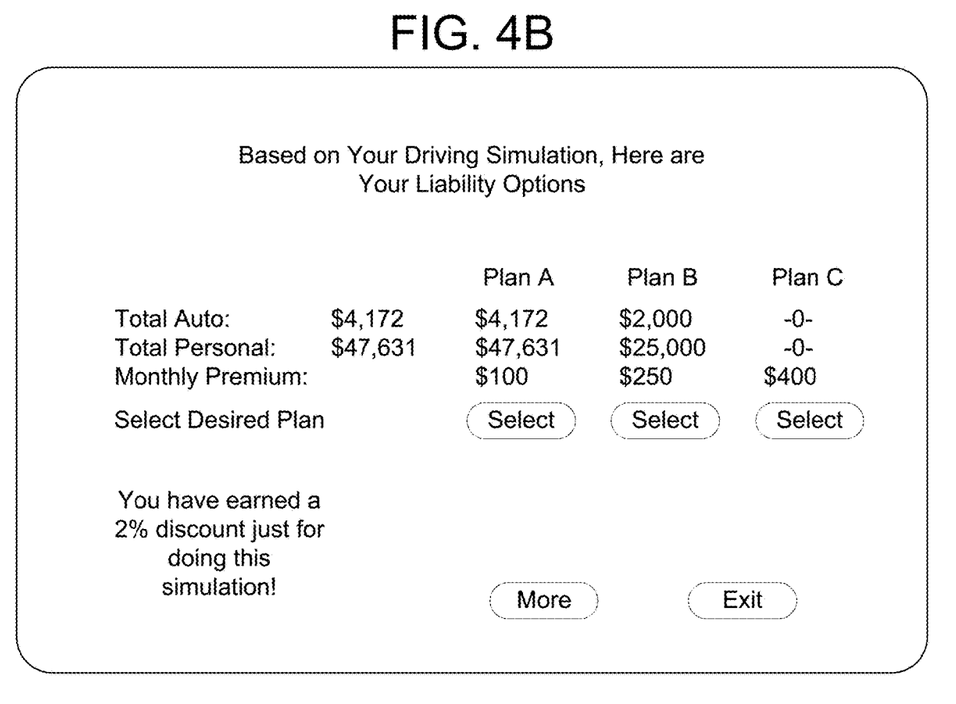

In step 212, the computing device 100 may then generate a display for the user, informing the user of the various liability estimates under the different available insurance policy options. FIG. 4B shows an example of such a display, and the user may be allowed to select one or more of the listed policy options for further information and eventual establishment of coverage.

In step 213, any selection(s) made by the user are processed by the computing device 100. The user may have selected one or more of the insurance policy options shown in FIG. 4B, and may have chosen to purchase the listed options. These selections may be processed in step 213 to process the purchase and establish insurance coverage for the user under the selected policy options. If the user chose a different option, such as to see more insurance policy options, or to exit the simulation process, then that selection would also be processed in step 213 to provide additional liability estimates or exit the program. In some embodiments, an insurance provider may offer an insurance discount to the user merely for engaging in the driving simulation.

Figure 5:
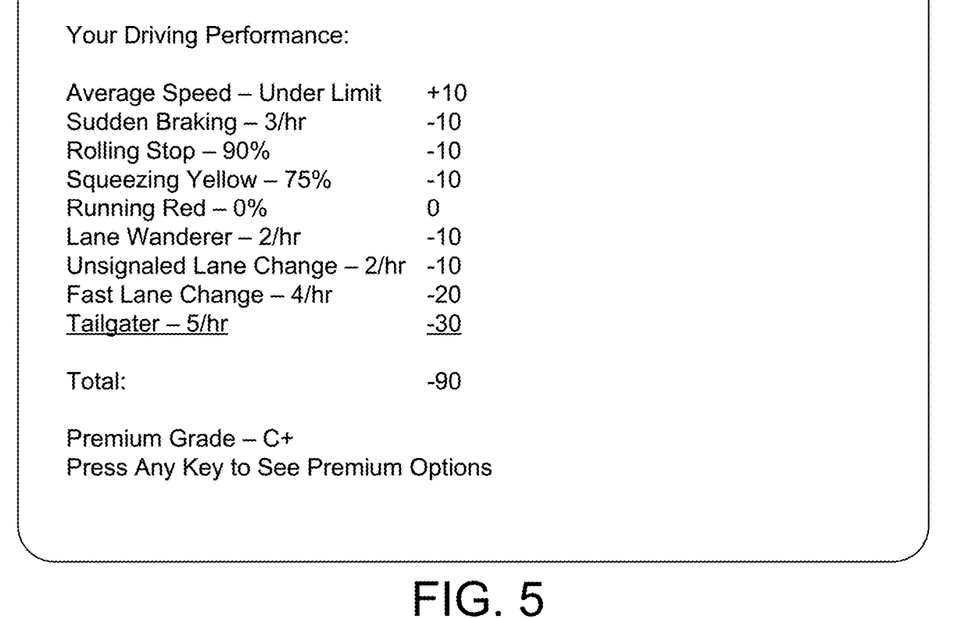

If, in step 207, the simulation ended without an accident, then in step 214, the computing device 100 may proceed with evaluating the user's driving performance data that was gathered during the simulation. This evaluation may include generating a driver score for the user based on all of the observations collected during the performance data collection 205 described above. FIG. 5 illustrates an example display that may be presented to the user to show the user how well (or poorly) the user drove during the simulation. As illustrated, there may be point values associated with the various observations, and a total driver skill value may be calculated by totaling the various point values.

When the user's driver skill has been assessed, the computing device 100 may generate for display a listing of a variety of policy offers in step 215. The policy offers may identify various insurance policies and options that are available to the user, and for each available policy offer, the listing may display a corresponding insurance premium that was calculated for the user based on the policy coverage and the user's driver skill. The listing may resemble that of the listing in FIG. 4B, although instead of listing damage liability estimates for the various policy offers, the listing may simply have the monthly premium (or other cost) and information identifying the policy offer (e.g., the coverage amount, deductible, and types of incidents covered).

After processing the user selection in step 213, the computing device 100 may proceed to step 216, and determine whether a home simulation is desired. A home simulation may be similar to a driving simulation, although instead of simulating the user's driving, the home simulation simulates the user's home life and likelihood of an event requiring homeowner's insurance (e.g., fire, burglary, etc.).

If a home simulation is desired (e.g., the user of the computing device 100 selects a home simulation option), then in step 217, the computing device 100 may collect information regarding the user's home and home habits. As with the driving information above, the home information may be collected by prompting the user, or the information may be collected automatically. In some embodiments, the user's home may be provided with monitoring devices (e.g., a home security system) that can track the user's home life habits, such as the time spent by the user at home, how often the user cooks on the stove, whether the user uses a fireplace, etc., and may report this information to the computing device 100. In some embodiments, the user may log into the computing device 100, and the device 100 may access an account that the user has on the device 100 or another server. For example, the user may have a profile with another service, which may provide the user's home information upon login.

Aside from user habit information, the home information may also include descriptive information of the home, such as the home's proximity to a fire station and police station, the crime rate in the neighborhood, the presence and usage of a home security system or smoke detector, the value of the home and its contents, the details of the home occupants (age, infirmities, etc.), the local weather history, and any other desired characteristic that may be useful for assessing homeowner insurance risk. This information may be entered by the user, or it may be automatically retrieved (e.g., from an account noted above) and/or derived. For example, if the user provides a home address, the device 100 may access one or more databases (e.g., on a remote computing device 140) to determine the address's proximity the a fire station and police station, the crime statistics for the neighborhood, the likelihood or history of floods occurring in the neighborhood, etc. If certain events are more likely to occur in the home (e.g., the home is located on a flood plain, making floods more likely, or the home is located in a high-crime area, making theft and burglary more likely), then those events may be given priority in the simulation, and may be simulated more often. The home simulation may increase the likelihood of simulating those types of events, and may use this likelihood in estimating home damages.

Figure 6:
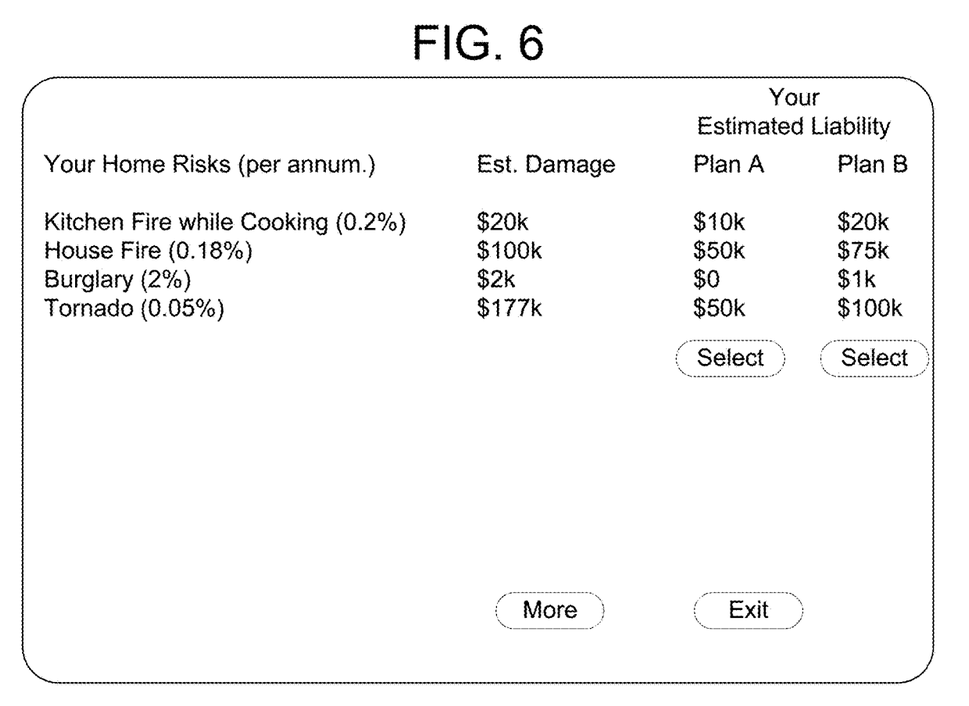

In step 218, the various home information may be evaluated by the computing device to assess an overall risk level for the home. The computing device 100 may identify individual risks of crime, fire, weather-related damage, and other insurable risks, and the evaluation may comprise establishing homeowner insurance premium levels for insuring against the various risks. The computing device 100 may use statistical information to generate likelihoods of various types of accident events, and in step 219, the computing device 100 may generate for display a listing of the various liability estimates for the different types of home accidents. FIG. 6 illustrates an example of such a listing, in which the user is able to see potential liability under different insurance plan options, and may make a selection as described above in step 213. The user's selection(s) may then be processed in step 220.

Although driving and home simulations are described above, the simulations herein are not limited to those types of events. To the contrary, any event that is capable of being simulated may be simulated in the manner described herein, and the user may be presented with a variety of estimated liability options corresponding to different insurance policy options for the simulated insurance event.

In step 221, the computing device 100 may determine whether a user has requested an adjuster test. Unlike the driving and home simulation examples above, the adjuster test may be used to simply test an insurance adjuster's ability to correctly estimate damages incurred in an accident. The test may be performed, for example, when an insurance company wishes to evaluate potential adjusters for employment. The test is described as being performed by the computing device 100, but that is solely for ease of description, and the test need not be performed by the same device administering the driving and home simulations described above. Indeed, any of the process steps described herein may be performed by different computing devices as desired.

If an adjuster test is desired, then in step 222, an accident may be simulated. The simulation of the accident may include the user indicating a type of desired accident (e.g., the user may be prompted to identify whether an automobile accident, home fire, home burglary, etc. is the desired accident), and then the computing device 100 generating the desired simulated accident. For this test, the computing device 100 may use the historical database discussed above, and retrieve information from actual accidents that have occurred in the past. For example, the computing device 100 may retrieve information for a previous home fire, and may gather the photographs of the scene and the actual costs of repair.

In step 223, the computing device may estimate the damages from the simulated accident. The damages may be the historical actual damages discussed above, or they may be computer-simulated damages for a virtual accident.

In step 224, the user is able to review the accident information (e.g., view the photographs of the scene, research information about the home or driver, etc.), and provide the user's own estimate of the damages incurred in the accident.

In step 225, the computing device 100 may compare the user's estimate with the computer-generated (or historical) estimate, and output a score based on how close the user's estimate was to the actual damages. The score may then be displayed to the user, and may be used to evaluate the user's accuracy. The process may then return to step 101, and the algorithm may repeat indefinitely (or until a request is received to halt the process).

The method illustrated in FIGS. 2A&B is merely illustrative. The described steps may be altered, combined, divided, rearranged, omitted, and/or augmented with additional functions as desired.

Figure 7:
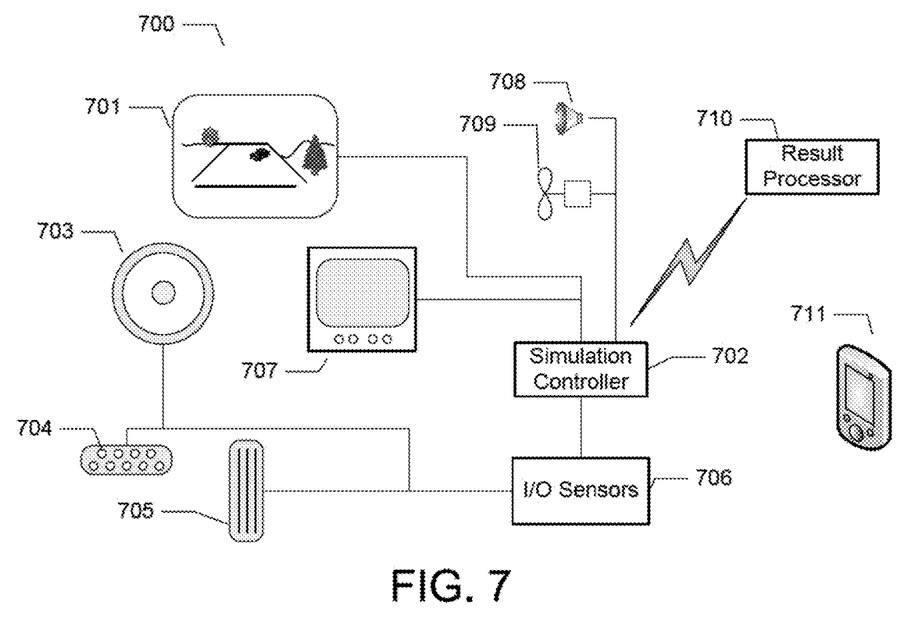
FIG. 7 illustrates an example driving simulation system employing various features described herein.

The illustrative method may be conducted using an automobile simulation system 700, as shown in FIG. 7. The system 700 may be, for example, a display booth or kiosk at a shopping mall. Users may use the kiosk to participate in a driving simulation, and receive offers for insurance, as described above. The components may be example implementations of components shown in FIG. 1. For example, there may be a display 701, which can be an example of an output device 108 used to depict the user interface and simulation displays shown in FIGS. 3A-6.

There may be a simulation controller computing device 702, which may be an implementation of the computing device 100, and which may execute program instructions to perform one or more of the various steps illustrated in FIGS. 2A&B.

There may be a steering wheel (or other type of steering input controller, such as a directional pad, analog stick, touch pad, etc.) input device 703, brake pedal 704 and gas pedal 705 (acceleration and deceleration input device, such as an analog button controller, gaming input device, touch pad, etc.), which may be implementations of the input devices 107 to gather user input during the driving simulation. The input devices may be simulated as well. For example, one or more cameras may detect the user's body and/or a handheld infrared device, and may interpret gestures as input commands. Those input devices 107 may communicate with one or more sensor processors 706, which may be electromechanical devices configured to sense positions of the input devices 107 and report them as electrical signals to the simulation controller 702. The sensor processors 706 may be embodied as part of the input devices 107 illustrated.

Additional input and/or output devices may include a dashboard interface 707. The dashboard interface 707 may simulate an automobile dashboard, and may include one or more information displays (e.g., speedometer, tachometer, global positioning system map, thermostat settings, etc.), and user inputs (e.g., simulated radio buttons, window controls, heating/cooling system controls, transmission gear shift controls, control interface for operating the simulator 700, etc.). Additional input/output devices may include one or more speakers 708 (which may also include microphones) to provide and receive sound, and one or more fans 709, which can provide the user with an unexpected burst of air during the driving simulation, or which may simply simulate the distraction of an open window. Other driving simulation devices, such as motor actuators to move a seat, additional displays to simulate views from other windows, may also be used.

As noted above, the simulation system 700 may be a kiosk placed at a shopping mall. When a user initially requests to use the kiosk, the kiosk may initiate a process of collecting information from the user. The information collection may be as simply as asking the user questions on the display 701/707, and receiving responses from the user, which identify the user's demographic information and/or the user's actual insurance account information or other identification information.

The simulation controller 702 may, in some embodiments, employ a remote results processor 710. The results processor 710 may, for example, be an insurance computer located at an insurance company's facility, remote from the location of the kiosk, and may receive the results of the user's driving simulation. The results may be gathered by the simulation controller 702 during the simulation (e.g., as a total driving score, or a log of the user's accident information), and transmitted by the controller 702 to the remote results processor 710. The remote results processor 710 may then analyze the user's performance, identify the insurance coverage options for the user, and transmit the options to the controller 702 for eventual display to the user on display 701.

In the description above, the user may use the simulation's display (e.g., display 707) as a user interface for communicating with the simulation system and initializing the simulation. In alternative embodiments, the user may use their own smartphone or other portable wireless computing device to communicate with the controller 702 and initiate the simulation. For example, the user may use a smartphone 711 to sign in to the kiosk by, for example, local exchange of the user's identification information via a local wireless communication, such as Bluetooth, using a local wireless network interface 109 of the controller 702. In some embodiments, the user may approach the kiosk, press a button on interface 707 to pair the controller 702 with the user's smartphone 711, and then use the smartphone 711 as an interface to communicate with the controller 702 and request the simulation. The results shown to the user in FIGS. 4A& B may also be transmitted from the result processor 710 to the smartphone 711, instead of to the controller 702 or display 707, to help protect the user's privacy. The user may then view the options on their smartphone 711, and make insurance option selections from the smartphone 711 as well.

Figure 8:
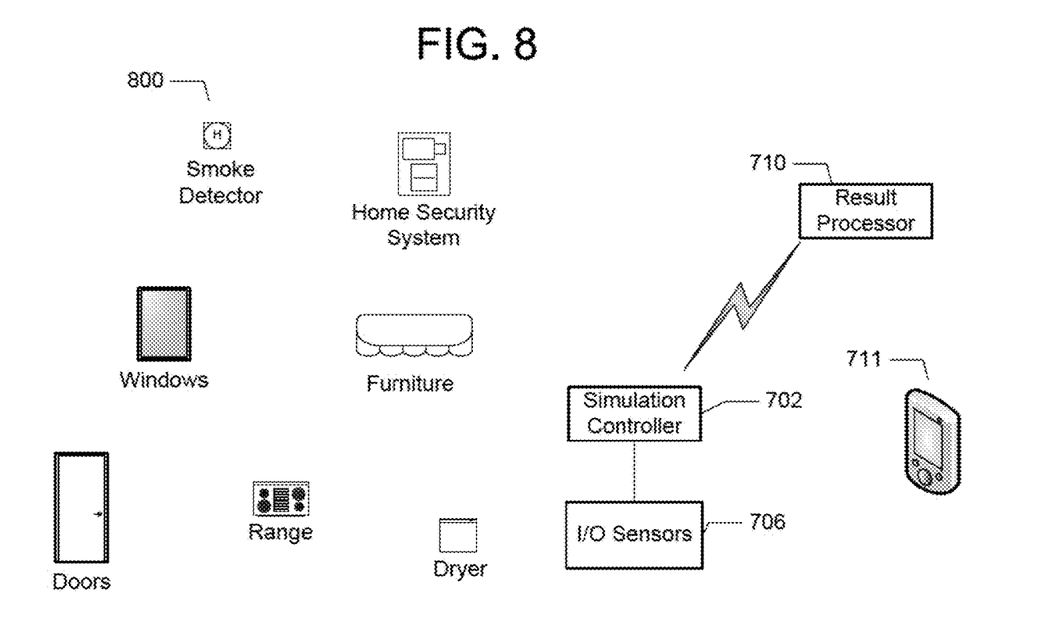
FIG. 8 illustrates an example home simulation system employing various features described herein.

While FIG. 7 illustrates an example driving simulation system 700 that simulates a driving experience and evaluates a driver's risk of an automobile accident, FIG. 8 illustrates an example home simulation system 800, which may simulate a user's home living experience and evaluate the user's risk of a home accident or insurance event (e.g., fire, flood, theft, etc.). Many of the elements, such as the controller 702, sensor processor 706, remote results processor 710 and smartphone 711 may be the same as in the driving simulation system 700, although they would perform their functions in the context of a home simulation instead of a driving simulation.

The home simulation system 800 may be built in a room-sized display at the shopping mall kiosk, and may include various simulated features of a home. For example, simulated doors, windows, furniture, kitchen appliances, clothes washer/dryer, heating and air conditioning systems, smoke detectors, etc. may be placed throughout the simulated home. Each of these simulated items may include a user interface display, and may communicate with the input/output sensor controller 706 and/or the simulation controller 702. The user may interact with the simulated items to, for example, provide information details of the home being simulated. This may entail, for example, the user informing the simulated windows how many windows are in the user's home, their type, whether they have home security sensors attached, etc. Similarly, the user may also interact with the other simulated items to inform them of their characteristics. The smoke detector may be informed of the last time the user replaced the battery; the range may be informed of the type of fuel; the home security system may be informed of the security type and provider, etc. Although each item may include its own user interface for obtaining this information, other embodiments may consolidate the user interface, and use a centralized computer (e.g., an interface with controller 702) to obtain information from the user. In some embodiments, the computing device 100 or a centralized computer may retrieve sensor information from the user's home. For example, the user's home may be equipped with sensors that are configured to report their status and usage information to a computing device that is accessible to the device 100 or centralized computer. The user may grant permission to the device 100 (e.g., by logging in with a secure password) to retrieve the sensor information from the user's home, and by doing so, the simulation may be a more accurate simulation of the user's actual home.

In addition to providing basic descriptive parameters of the various simulated items, the items may also allow the user to indicate usage patterns. The user may inform the range of the user's cooking habits (times cooking per week, burners used, etc.); the user may inform the windows of how often the user leaves the windows open and when; the user may indicate how often they test the smoke alarm or how regularly they activate the home security system, etc. As noted above, this information may also be retrieved from the user's home devices, to improve the accuracy of the home simulation.

In addition to providing information about the items in the simulated home, the user may also be permitted to provide information about the home itself. This may be done, for example, using a display interface of the controller 702, or any of the simulated items' interfaces. The information about the home may include its location (e.g., street address, ZIP code), structure type (e.g., single-family home, multi-dwelling apartment, etc.), age, construction type (e.g., brick, log house, etc.), maintenance history, etc. Any information that an insurance company may find useful in evaluating the home insurance risk of a home may be obtained by the controller 702 and used to simulate the user's home.

The various information provided by the user to the simulated items may be provided to the sensor controller 706 and/or simulation controller 702, and the controller 702 may conduct a simulation of the user's home living situation, as done above in the driving simulation. The simulation may be over an accelerated time period (e.g., simulating a year in a few minutes) using statistical likelihoods based on the parameters of the simulated items in the user's simulated home. The simulation results may be provided to the results processor 710, and an array of home insurance options may be provided to the user as a result.

Figure 9A:
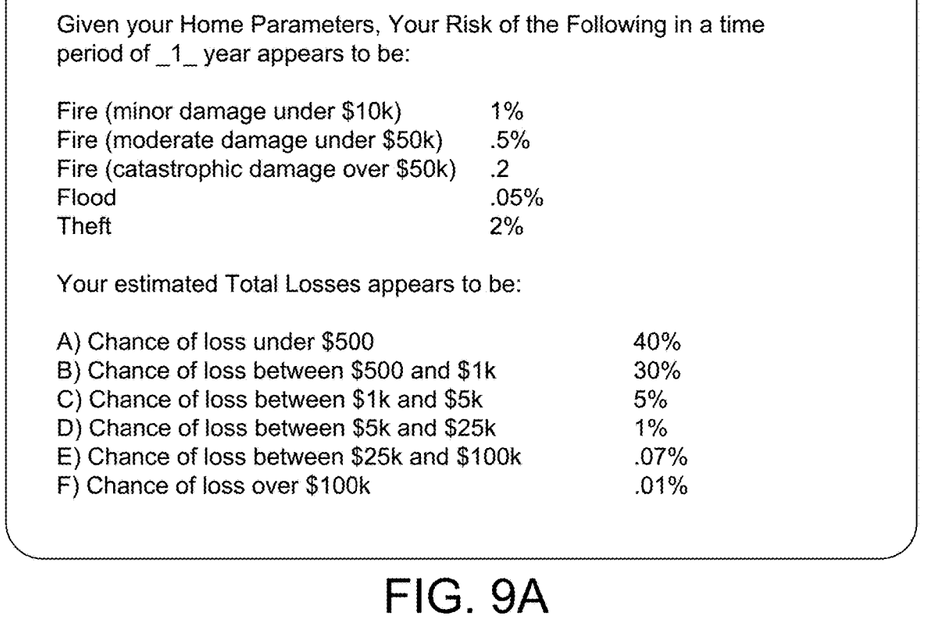
FIGS. 9A-B illustrate additional example screen displays that may be provided to the user.

FIGS. 9A&B illustrate an example display, similar to the ones shown in FIGS. 4A&B, but in the home simulation context. So, for example, the FIG. 9A display may inform the user of the system's estimated likelihood that the user's home will suffer a loss in the time period of the simulation (e.g., a user-selected period of one year), and may identify the types of dollar amount losses with a corresponding total estimated risk.

Figure 9B:
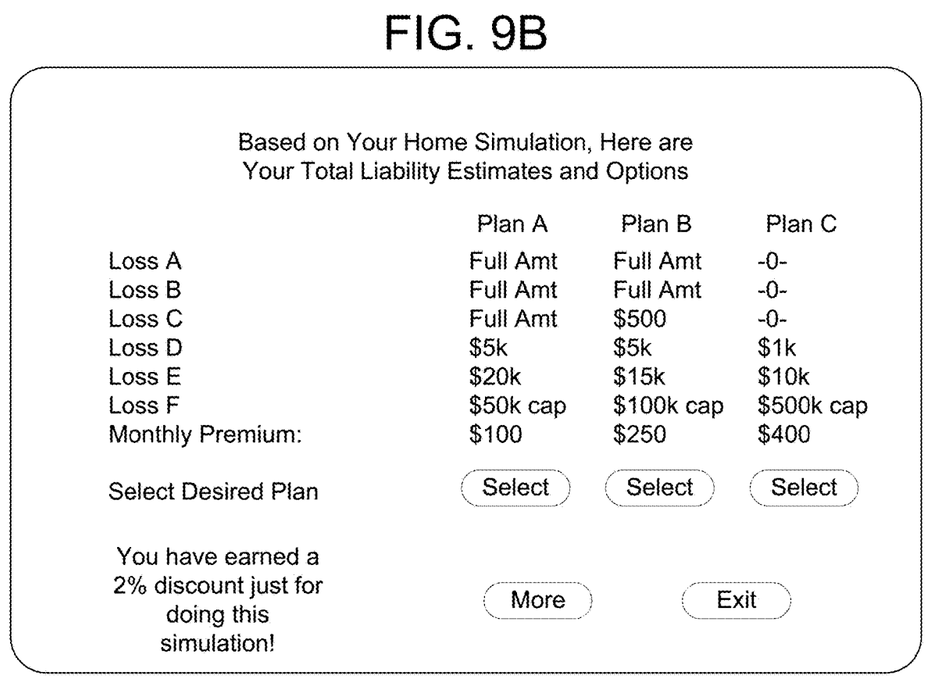

FIG. 9B may then illustrate the total estimated losses, and inform the user of what the user would have to pay under the various different insurance plan options selected by the result processor 710. As with FIG. 4B, the user in FIG. 9B may choose a plan to learn more about that type of coverage, and may use the interface to purchase coverage under a selected option.

The examples above illustrate various systems and methods for using virtual simulations to help customers select the ideal amount of insurance for their needs. Features herein have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional. The various steps may also be performed by alternative computing devices. For example, the steps performed by the controller 702 may be performed by the result processor 710 instead, and vice versa. Some steps may also be performed by the user's smartphone 711.

What is claimed is:

1. A home insurance simulation system, comprising:
   a first computing device, wherein the first computing device comprises:
      an input device;
      a display device configured to display a simulated home comprising a simulated window and a simulated door;
      an input/output module communicatively coupled with the input device and the display device;
      at least one processor communicatively coupled to the input/output module; and
      a first memory storing first computer executable instructions that, when executed by the at least one processor, cause the at least one processor to:
         receive, from the input device, via the input/output module, and based on a user interaction with at least one of the simulated door and the simulated window displayed on the display device, characteristic information identifying characteristics of one or more structures, in a home of a user, corresponding to the at least one of the simulated door and the simulated window;
         perform, based on the received characteristic information, a simulation of living conditions of the home to generate simulation information, wherein the simulation comprises simulating operation of the at least one of the simulated door and the simulated window over a predetermined period of time and in accordance with the received characteristic information;
         estimate, based on the simulation information generated by the simulation of the living conditions of the home, a risk of incurring damages in a simulated home insurance event; and
         generate, based on the risk of incurring damages in the simulated home insurance event, a liability estimate corresponding to a coverage under an insurance policy option.

2. The home insurance simulation system of claim 1, further comprising:
   a second computing device, wherein the second computing device comprises:
      at least one results processor; and
      a second memory storing second computer executable instructions that, when executed by the at least one results processor, cause the second computing device to:
         receive, from the first computing device, information relating to the estimated risk of incurring damages in the simulated home insurance event;
         select, based on the information relating to the estimated risk of incurring damages in the simulated home insurance event, the insurance policy option; and
         determine the liability estimate using the insurance policy option.

3. The home insurance simulation system of claim 2, wherein the first computing device further comprises:
   a wireless network interface configured to communicate wirelessly with the second computing device and with a smartphone of the user to receive and transmit information relating to the simulation of the living conditions of the home.

4. The home insurance simulation system of claim 3, wherein the
   first computer executable instructions, when executed by the at least one processor, further cause the at least one processor to:
   transmit, via the wireless network interface and to the smartphone, the liability estimate and instructions for the smartphone to display, on a display of the smartphone, the liability estimate.

5. The home insurance simulation system of claim 1, wherein the characteristic information comprises information identifying window usage habits of the user, and
   wherein the first computer executable instructions, when executed by the at least one processor, further cause the first computing device to use the information identifying window usage habits of the user in estimating the risk of incurring damages in the simulated home insurance event.

6. The home insurance simulation system of claim 1, wherein the simulated home further comprises a simulated household appliance and a simulated home security system, and
wherein the first computer executable instructions, when executed by the at least one processor, further cause the first computing device to:
receive, from the input device, via the input/output module, and based on a user interaction with at least one of the simulated household appliance and the simulated home security system, information identifying usage habits, of the user, of one or more structures in the home corresponding to the at least one of the simulated household appliance and the simulated home security system; and
use the information identifying usage habits of the user in estimating the risk of incurring damages in the simulated home insurance event.

7. The home insurance simulation system of claim 1, wherein the first computer executable instructions, when executed by the at least one processor, further cause the at least one processor to output, to the display device and via the input/output module, information identifying a discount to be awarded the user in response to the user using the home insurance simulation system.

8. The home insurance simulation system of claim 1, wherein the first computer executable instructions, when executed by the at least one processor, further cause the at least one processor to output, to the display device and via the input/output module, information identifying premiums corresponding to the coverage under the insurance policy option.

9. The home insurance simulation system of claim 1, wherein the home insurance simulation system is implemented in a kiosk.

10. The home insurance simulation system of claim 1, wherein the first computer-executable instructions, when executed by the at least one processor, further cause the at least one processor to:
receive, via a wireless network interface, and from one or more devices associated with one or more structures in the home, sensor data indicating usage of the corresponding structure; and
perform, further based on the sensor data, the simulation of the living conditions of the home.

11. The home insurance simulation system of claim 1, wherein the first computer-executable instructions, when executed by the at least one processor further cause the at least one processor to initiate the coverage under the insurance policy option.

12. An insurance simulation system, comprising:
a computing device, including:
an input device;
a display device configured to display a simulated home comprising a simulated door and a simulated window; and
an input/output module communicatively coupled to the input device and the display device;
at least one processor communicatively coupled to the input/output module; and
a memory storing computer executable instructions that, when executed by the at least one processor, cause the at least one processor to:
receive, from the input device, via the input/output module, and based on a user interaction with at least one of the simulated door and the simulated window displayed on the display device, characteristic information identifying characteristics of one or more structures, in a home of a user, corresponding to the at least one of the simulated door and the simulated window;
perform, based on the received characteristic information, a simulation of living conditions of the home to generate simulation information, wherein the simulation of the living conditions of the home comprises simulating operation of the at least one of the simulated door and the simulated window over a predetermined period of time and in accordance with the received characteristic information;
estimate, based on the simulation information generated by the simulation of the living conditions of the home, damages in a simulated home insurance event; and
determine, based on the estimated damages in the simulated home insurance event, a user liability for the damages under an insurance option.

13. The insurance simulation system of claim 12, wherein the computing device further comprises:
a wireless network interface configured to communicate wirelessly with a smartphone of the user to receive and transmit information relating to the simulation of the living conditions of the home.

14. The insurance simulation system of claim 13, wherein the computer executable instructions, when executed by the at least one processor, further cause the at least one processor to transmit, via the wireless network interface and to the smartphone, the user liability.

15. The insurance simulation system of claim 12, wherein the characteristic information comprises information identifying window usage habits of the user, and
wherein the computer executable instructions, when executed by the at least one processor, further cause the at least one processor to use the information identifying window usage habits of the user in estimating the damages.

16. The insurance simulation system of claim 12, wherein the simulated home further comprises a simulated household appliance and a simulated home security system, and
wherein the computer executable instructions, when executed by the at least one processor, further cause the at least one processor to:
receive, from the input device, via the input/output module, and based on a user interaction with at least one of the simulated household appliance and the simulated home security system, information identifying usage habits, of the user, of one or more structures in the home corresponding to the at least one of the simulated household appliance and the simulated home security system; and
use the information identifying usage habits of the user in estimating the damages.

17. A method, comprising:
receiving, by a first computing device and via an input device associated with the first computing device, user interactions with at least one of a simulated door and window;
performing, by the first computing device and based on the user interactions with the at least one of the simulated door and window, a simulation of living conditions of a home of a user to generate simulation information, wherein the simulation comprises simulating operation of the at least one of the simulated door and window over a predetermined period of time and in accordance with the received user interactions;

estimating, based on the simulation information generated by the simulation of the living conditions of the home, a risk of incurring damages in a simulated home insurance event; and generating, based on the risk of incurring damages in the simulated home insurance event, a liability estimate corresponding to a coverage under an insurance option.

18. The method of claim 17, further comprising:

transmitting, from the first computing device, via a communication interface, and to a portable wireless device of the user, the liability estimate.

19. The method of claim 17, further comprising initiating, by the first computing device, the coverage under the insurance option.

20. The method of claim 17, further comprising:

outputting, to a display device associated with the first computing device, an offer of an insurance discount to the user in response to the user engaging in the simulation.

* * * * *